Aug. 28, 1928.
F. K. VREELAND
1,682,026
PREVENTION OF INTERFERENCE IN RADIORECEPTION
Filed July 12, 1921   2 Sheets-Sheet 1
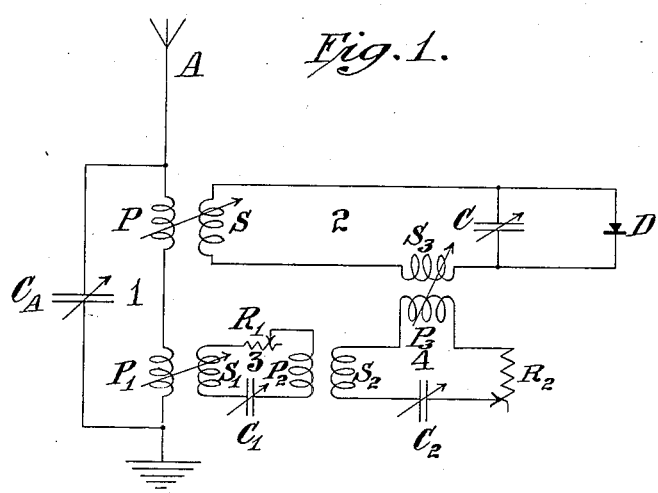
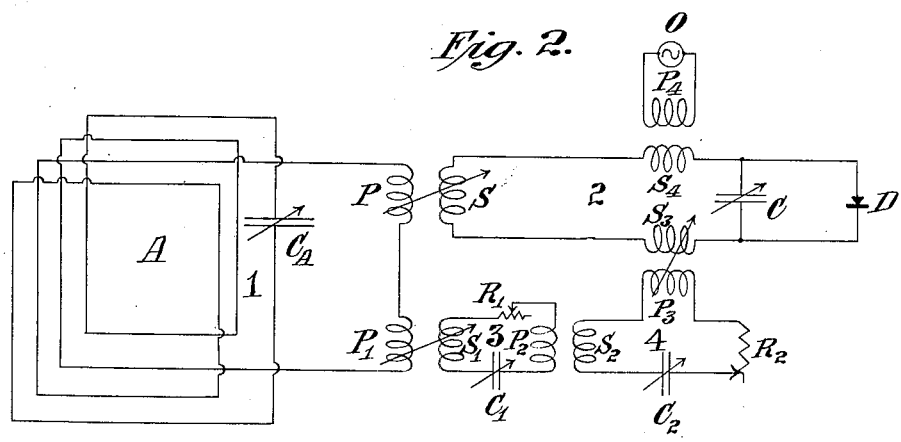
INVENTOR
Frederick K. Vreeland
BY
Frank L. Ayer
ATTORNEY Aug. 28, 1928.

F. K. VREELAND 1,682,026

PREVENTION OF INTERFERENCE IN RADIORECEPTION

Filed July 12, 1921   2 Sheets-Sheet 2

INVENTOR
Frederick K. Vreeland
BY
Frank L. Dyer
ATTORNEY

Patented Aug. 28, 1928.

1,682,026

UNITED STATES PATENT OFFICE.

FREDERICK K. VREELAND, OF MONTCLAIR, NEW JERSEY.

PREVENTION OF INTERFERENCE IN RADIORECEPTION.

Application filed July 12, 1921. Serial No. 484,059.

My invention relates to various new and useful improvements in prevention of interference with radio reception, my object, in general, permitting the reception of radiant energy from a given source and the simultaneous elimination of interference by radiation from other sources.

In my application for Letters Patent, filed July 28, 1920, Serial No. 399,534, I describe an improved radio system having the same general object in view and generically my present invention embodies the same principles as set forth in the aforsaid application. By means of my present invention I secure simplification of apparatus and adjustments, and obtain greater flexibility of operation with a complete annulment of interfering signals whether of a continuous wave or damped wave type.

In my application aforesaid I described a method and apparatus whereby signals are received in full strength, while interfering impulses acting on the receiver are balanced and annulled by the effect of a balancing current, derived from the waves which produce the interference, whose effect on the receiving system is opposite in phase and equal in magnitude and decrement to the effect of the interfering impulses. The apparatus employed includes a signal receiving circuit preferentially responsive to signal impulses, with associated collecting means, a balancing circuit preferentially responsive to impulses of interfering frequency, and means for deriving from the current in the balancing circuit an effect equal and opposite to the effect of the interfering impulses on the receiving system. In the specific arrangement of that application phase opposition of the balancing impulse is secured by a double process of approximate quadration, whereby the electromotive force which excites the balancing current is made approximately in phase opposition to the interfering current, and the balancing current is made precisely in opposition by phasing adjustment of the constants of the balancing circuit. In the preferred arrangement of my former application the double quadration is secured, first by a lead or lag approximating quadrature of the interfering current in the signal collecting circuit, resulting from its detuning at interfering frequency; and second by the use of a collector for the balancing circuit which produces directly an electromotive force in approximate quadrature with that acting on the signal circuit.

The present invention utilizes certain features of my former application, but by means of the present improvement I avoid the use of a separate collecting function and derive the balancing impulses from the interfering current itself. The requisite phase opposition may be secured by various means, several of which are disclosed herein. It may be accomplished by a double quadration as in the former application, in which case the second quadration is produced preferably by an intermediate quadrating circuit, or the phase opposition may be secured by a single phasing adjustment as hereafter explained.

This improvement results in greatly simplifying the apparatus and its manipulation. It is also practically universal in its application. It may be applied as an adjunct to any existing receiving system, whether for continuous or damped waves, whether employing an electro-static collector or antenna, an electromagnetic collector or loop, a ground wire or other collecting means and whether the collecting system is tuned or aperiodic. The balance of interference, once secured, is not disturbed by tuning or other manipulation in the receiving system proper, since the balancing impulses are derived from the same current that produces the interfering impulses, and any change in the one will affect equally the other, thus maintaining the balance.

In the accompanying drawing forming a part of this application:

Fig. 1 represents the invention in generalized form.

Fig. 2 shows a similar application of the invention to a loop collector, and including reception by the beats method.

Figure 3:
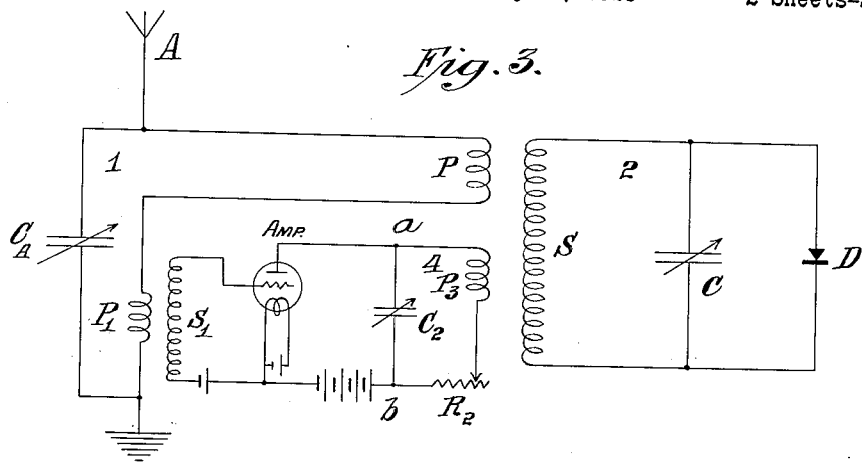
Fig. 3 shows a modification including only one phasing adjustment.

In the arrangement of Fig. 1, 1 is a collector circuit comprising the collector proper A, coupling inductances P P$_1$ and a tuning capacity C$_A$. The collector A is shown in conventional form as an open antenna, though it will be understood that a loop or ground wire or other equivalent collector may be used with similar effect. The collecting circuit 1 may be tuned to the signal frequency by adjusting either the inductances P P$_1$ or the capacity C$_A$ or by other equivalent means. An aperiodic or detuned collector may be used with similar effect, if desired. The primary coil P is coupled to a secondary coil S in a signal receiving circuit 2, which includes also a tuning capacity C and a second secondary coil $S_3$. This circuit 2 is preferably tuned to the signal frequency, and the signal oscillations introduced therein are impressed on a detector or other signal observing means D, here shown in its conventional generalized form. Any desired form of detector or signal receiving means may be employed, including receivers of ordinary spark signals and receivers of continuous waves signal operating on the beats principle or otherwise. The particular form of receiving apparatus or circuits used is not material to the present invention.

The coil $P_1$ is coupled to a secondary coil $S_1$ in a quadrating circuit 3, including a capacity $C_1$, another primary coil $P_2$ and when desired a resistance $R_1$. This circuit 3 is tuned approximately to the interfering frequency.

The coil $P_2$ is coupled to a secondary coil $S_2$ in the balancing circuit 4, including a tuning capacity $C_2$, a coupling coil $P_3$ and resistance $R_2$. The balancing circuit 4 also is tuned approximately to the interfering frequency. The coil $P_3$ is coupled to the coil $S_3$ in the receiving circuit 2, and serves to impress on that circuit balancing impulses equal in intensity and decrement and opposite in phase to the interfering impulses coming through the signal coupling P S.

Couplings $P_1 S_1$, $P_2$, $P_3 S_3$ are preferably sufficiently loose to permit substantially free oscillations of the circuits 3 and 4, or at best to make the system 3, 4 preferentially responsive to the interfering frequency, and one or more of them is made adjustable.

In operation the collector circuit 1, being preferably tuned to the signal frequency, is responsive to signals of this frequency. It will also be the seat of forced oscillations of the frequency of the interfering radiation, and these interfering impulses will be transmitted to receiving circuit 2, notwithstanding the usual precautions of tuning and loose coupling. These interfering impulses are balanced and annulled by equal and opposite impulses transmitted through the primary coil $P_1$ and the circuits 3 and 4 to the secondary coil $S_3$.

Equality of strength between the interfering impulses and the balancing impulses is secured preferably by adjusting one of the couplings P S, $P_1 S_1$, $P_2 S_2$ or $P_3 S_3$.

The electromotive forced induced in the coil $S_1$ will be in quadrature with the current in the coil $P_1$. The circuit 3 being approximately non-reactive at the interfering frequency, the current induced therein at this frequency will be approximately in phase with the impressed electromotive force, and hence in quadrature with the interfering current in 1. Any current induced therein at signal frequency will be relatively small by virtue of the unbalanced reactance due to detuning and in quadrature with the signal electromotive force.

The electromotive force impressed on the circuit 4, through the coupling $P_2 S_2$ will in turn be in quadrature with the current in the circuit 3, and the current in 4 will be also in quadrature, more or less approximately, depending upon the tuning of the circuit 4.

Since the current in circuit 4 is approximately in quadrature with the current in the circuit 3, and this, as already explained, is approximately in quadrature with the interfering current in the circuit 1, the balancing current in 4 is in opposition to the interfering current in 1, the direction of the various windings being appropriately selected. Any departure from the precise quadrature relation in the various circuits is compensated by a slight adjustment of the reactances in one of the circuits; for example, by adjustment of the capacity $C_2$. Precise opposition of phase between the interfering and balancing electromotive forces being secured, their intensities are equalized preferably by varying one of the couplings, such as the coupling $P_3 S_3$, although it may also be accomplished by varying one of the resistances $R_1 R_2$, or by equivalent means.

When continuous wave interference is being balanced out, no further adjustment is necessary, since the interfering and balancing impulses impressed on the circuit 2 will completely annul each other when equalized in magnitude and in phase, except at the moments of growth and decay of the oscillations, and these relatively trivial effects may be completely equalized if desired by the means employed with damped waves, as I shall explain.

Where the interfering impulses are damped it is necessary to make the decrement of the balancing impulses equal to the decrement of the interfering impulses if complete annulment is to be secured. For this purpose the damping resistances $R_1 R_2$ are of special utility. If the collector circuit 1 is tuned to the signal frequency the free signal oscillations in this circuit will have a decrement depending not only on the signal decrement but also on the damping of the collector circuit. Interfering oscillations of nonsignal frequency in this circuit will, however, have approximately the decrement of the interfering radiation, being forced oscillations by virtue of the detuning. If the damping of the coupling circuit 3 were smaller than that of the interfering radiation, the oscillations in this circuit might be prolonged, thus impressing on the circuit 4 and through it on the circuit 2 impulses of lower decrement than the interfering impulses, which would not balance. If, however, the decrement of the coupling circuit 3 is made equal to or greater than that of the interfering impulses the current in the circuit 3 will have the same decrement as these impulses. This result is accomplished by suitable choice of resistance or other damping means $R_1$. Similarly the decrement of the balancing circuit 4 is so chosen that the currents in this circuit will also have the same decrement as the interfering impulses. The balancing impulses impressed on the circuit 2 through the coupling $P_3 S_3$ being thus equal in frequency, magnitude, phase and decrement to the interfering impulses impressed through the coupling P S, complete annulment is secured.

It is sometimes convenient to make the damping of the balancing circuit 4 greater than is required to secure the required decrement in order to facilitate phase adjustment. It will be understood that if the damping of the circuit 4 is very small, an exceedingly small change in the reactance will produce a very large change in the phase of the balancing current. By introducing damping through the resistance $R_2$ or otherwise, this adjustment is made less critical and by varying the resistance $R_2$ it may be made as broad as desired.

It is usually desirable that the damping of the circuit 3 should not be larger than is required to secure the desired decrement of the balancing currents, particularly when the interfering frequency is but slightly different from the signal frequency.

By the use of the present invention, the annulment of interfering impulses is not approximate, but absolute, and they may be completely eliminated even though enormously greater in strength than the signals. The reason why this annulment is secured without sensible diminution of the signal strength may be thus stated: Currents of signal frequency in the circuits 3 and 4 are normally very small by virtue of the detuning of these circuits. Where the frequency difference between the signals and interference is excessively small however, so that signal currents of material strength may be induced in these circuits, these currents will not neutralize the signal currents in the circuit 2 since they do not have the phase opposition that characterizes the interfering and balancing currents. This is due to the fact that currents of signal frequency set up in the circuits 3 and 4 will be approximately in quadrature with the impressed electromotive forces, instead of being in phase as in the case of the interfering currents, and the induced currents will be either approximately in phase or in opposition to the inducing current, according to the proportioning of capacity or inductance reactance. This is true even though the detuning of these circuits is very small, provided the damping is not too great. For this reason it is desirable when working on small frequency differences to make the damping at least in the circuit 3 relatively small. Where both the circuits 3 and 4 are feebly damped the double opposition or synchronous relation of signal currents will cause an augmentation of the signal strength in circuit 2, instead of annulment as in the case of interference. It will thus be seen that by means of the present invention interfering radiation of frequency only slightly different from the signal radiation may be completely balanced out without weakening the signals.

Another advantage of the present invention is that the interference balance does not depend upon the adjustment of the circuits 1 and 2 for the purpose of tuning to signals of different frequencies. Such adjustment in the circuit 1 will affect the current in the coils P and $P_1$ alike, so that any variation in the interfering electromotive force induced by the coil P in the circuit 2 will be equal to the variation in the balancing electromotive force induced by the coil $P_2$. Since these electromotive forces are equal, the balance is not disturbed by adjustment in the circuit 2. Hence the apparatus, once adjusted for a given interfering radiation, will remain in adjustment over a wide range of tuning of the receiving system.

For convenience I prefer to make the circuits 3 and 4 similar or at least to make the capacities $C_1$ and $C_2$ alike, so that the adjustments of the two will be equal. They may then be coupled mechanically so that a single operation will adjust both circuits to the interfering frequency.

It will be readily understood that where more than one interfering radiation is to be eliminated, the balancing system including the coils $P_1$ and $S_3$ and the circuits 3 and 4 may be duplicated or multiplied to any desired degree. Each of the balancing units similar to $P_1$, 3, 4, $S_3$ may then be adjusted to a different interfering radiation.

Fig. 2 shows the invention applied to a loop collector with provision for beats reception. Here A is the collecting loop. $C_A$ is a tuning capacity and P and $P_1$ are coupling coils for the signal receiving system and the interference balancing system, respectively. O is a local source of oscillations which act through the coupling $P_4 S_4$ to produce beats with the signal oscillations in the circuit 2, in the well known manner. The apparatus is otherwise as in Fig. 1.

Fig. 3 shows another modification of the invention in which the requisite phase opposition of the balancing current is secured without requiring an individually tuned quadrating circuit between the collector circuit and the balancing circuit. In this figure, 1 as before is the collector circuit, having coils P and $P_1$ acting respectively on the receiving circuit 2 and the balancing system. The balancing system comprises a coil $S_1$ coupled to the primary coil $P_1$, and constituting the input circuit of a radio frequency amplifier Amp. The ratio of transformation of the transformer $P_1$ $S_1$ is preferably high. The output circuit of the amplifier comprises a balancing circuit 4 including the inductance $P_3$ and capacity $C_2$, which are connected in the output circuit in parallel relation, and when desired the resistance $R_2$. The coil $P_3$ is coupled as in the previously described arrangements to the inductance S of the receiving circuit 2. The circuit 4 is tuned approximately to the interfering frequency, the necessary phase adjustment being secured by varying the capacity of the condenser $C_2$.

The transformer $P_1$ $S_1$ acts as a potential transformer, impressing an electromotive force of interfering frequency on the grid of the amplifier tube. This electromotive force is amplified, and impressed on the balancing circuit at the potential points $a$, $b$. Since the capacity and inductance reactances of this circuit are approximately equal, it will act as a high impedance, hence the electromotive force applied at the points $a$, $b$, will be approximately in opposition to that impressed on the amplifier by the coil $S_1$, and in quadrature with the interfering current in the collector circuit P, $P_1$. The current in the coil $P_3$ will be approximately in quadrature with this electromotive force, hence it will be in the requisite phase relation for opposing the effect of the interfering current in the coil P. This phase relation is controlled by varying the capacity $C_2$ so as to secure precise opposition.

Figure 4:
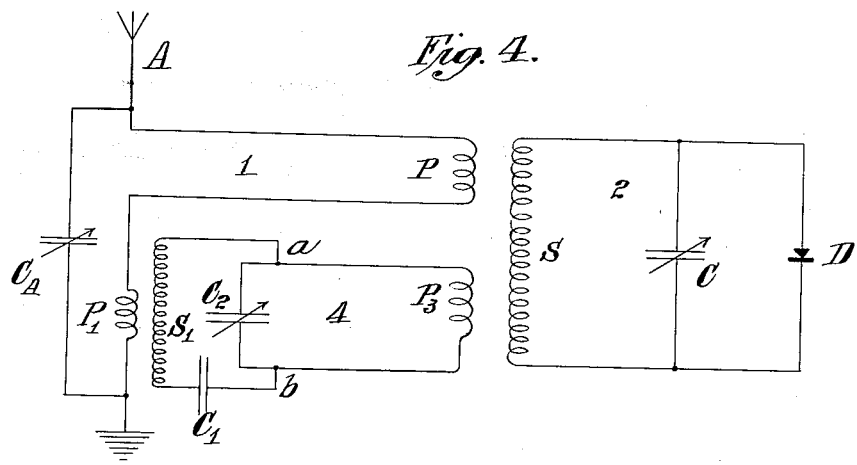
Fig. 4 shows a further modification.

Another modification is shown in Fig. 4. In this arrangement the amplifier is omitted, and the secondary coil $S_1$ is connected directly across the potential points $a$, $b$, of the balancing circuit 4. This circuit is preferably made of low effective resistance, although in some cases a resistance may be desirable. The coil $S_1$ has preferably an inductance reactance that is large compared with the reactances of the condenser $C_2$ and inductance $P_3$—say for example 100 to 1000 times as large—so that it does not materially modify the tuning of the circuit 4. The circuit with its approximately equal capacity and inductance reactances, connected in parallel across the coil $S_1$, will act as a high impedance which will not draw any material current from the coil $S_1$, and the transformer $P_1$ $S_1$ acts substantially as a potential transformer. In practice, however, there may be considerable departure from the ideal conditions, since the circuit 4 will dissipate energy through its effective resistance which must be supplied by an energy current in the coil $S_1$. To reduce the impedance of the coil $S_1$ to this energy current it is desirable to insert a small condenser $C_1$ whose capacity reactance approximately balances the inductance reactance of the coil $S_1$. It is not necessary, however, to adjust this capacity accurately. It is sufficient to give it an approximately correct value, since a wide variation of the high impedances of $S_1$ and $C_1$ is permissible without materially affecting the adjustment of the circuit 4. This arrangement thus operates effectively with only one phasing adjustment, which is preferably in the condenser $C_2$, and the intensity adjustment of one of the couplings such as that of $P_3$ to S.

This arrangement permits a very wide variation in the constants of the system from the preferred proportions above outlined. For example the coil $S_1$ may have a relatively low inductance, comparable to that of the coil $P_3$. In this case the constants of the circuit 4 should be modified until the equivalent reactance of the parallel connected capacity and inductance $C_2$ $P_3$, is nearly but not quite equal to the reactance of the inductance $S_1$ and capacity $C_1$, or of the coil $S_1$ alone when the condenser $C_1$ is omitted. The whole system including the coil $S_1$ and the circuit 4 is thus tuned to nearly but not quite the interfering frequency. If tuned to full resonance at this frequency the current in the coil $P_3$ would be approximately in quadrature with the interfering current in the coil P, instead of in opposition. A slight change in the capacity $C_2$, however, either an increase or a diminution, will produce the requisite phase relation, according to the direction of winding of the various couplings. Usually there is one direction of coupling that is preferable because of stray capacities and other incidental effects which modify the ideal phase relations described.

This invention is useful not only for eliminating interference by foreign signals, but is also useful in excluding atmospheric strays. When used for this purpose the collecting circuit 1 is tuned to a frequency different from the signal frequency. Atmospheric strays will then set up shock oscillations in this circuit of non-signal frequency. By adjusting the balancing system to this same non-signal frequency the effect of the stray oscillations on the receiver may be balanced by an equal and opposite effect produced by the balancing system, careful attention being given to equalizing the two effects in decrement as well as in magnitude and in phase.

It will be understood that the invention is not limited to the precise arrangement shown. In fact it is practically universal in its applicability to receiving systems of widely different characters.

Having now described my invention what

I claim as new therein and desire to secure by Letters Patent is as follows:

1. The method of receiving radio signal impulses and simultaneously eliminating sustained radio signal interference which consists in neutralizing the effect of interfering signal currents by an equal and opposite effect selectively derived from the same radio signal current that produces the interfering effect, and observing the unbalanced signal effect.

2. The method of receiving radio signal impulses and simultaneously eliminating sustained radio signal interference which consists in deriving from the same radio signal current that produces the interfering effect a balancing current opposite in phase to the interfering current, equalizing the effects of the interfering and balancing currents on the receiving system to produce mutual neutralization, and observing the unbalanced signal effect.

3. The method of receiving radio signal impulses and simultaneously eliminating interference which consists in deriving from the interfering current a balancing current in opposite phase relation by a double process of approximate quadration together with a fine adjustment of phase, equalizing the effects of the interfering and balancing currents on the receiving system and observing the unbalanced signal effect.

4. The method of receiving radio signal impulses and simultaneously eliminating sustained radio signal interference which consists in deriving from the same radio signal current that produces the interfering effect, an electromotive force approximately in opposition to said interfering current, producing by this electromotive force a balancing current precisely in opposition to the interferring current, equalizing the effects of the interfering and balancing currents on the receiving system and observing the unbalanced signal effect.

5. The method of receiving radio signal impulses and simultaneously eliminating interference which consists in deriving from the interfering current a second current approximately in quadrature therewith, deriving from the second current a third or balancing current approximately in quadrature with the second and precisely in opposition to the interfering current, equalizing the effects of the interfering and balancing currents on the receiving system and observing the unbalanced signal effect.

6. The method of receiving radio signal impulses and simultaneously eliminating sustained interference which consists in mingling the signal and interfering currents in a common collecting system, deriving a current of signal frequency from the signal current, deriving a balancing current of interfering frequency from the interfering current, controlling the phase and magnitude relations of the balancing current to produce an effect which neutralizes the effect of the interfering current, and observing the unbalanced effect of the signal current.

7. The method of receiving radio signal impulses and simultaneously eliminating sustained radio signal interference which consists in mingling the signal and interfering currents in a common collecting system, selectively deriving from the same radio signal current that produces the interfering effect a balancing current of interfering frequency, deriving from the balancing current an effect which neutralizes the effect of the interfering current but does not neutralize the effect of the signal current, and observing the unbalanced signal effect.

8. The method of receiving radio signal impulses and simultaneously eliminating sustained radio signal interference which consists in deriving from the same radio signal current that produces the interfering effect a balancing current in phase opposition thereto, causing the interfering and balancing currents to act on the receiving system with equal and opposite effects thereby annulling each other, and receiving the unbalanced signal current.

9. The method of receiving radio signal impulses and simultaneously eliminating sustained radio signal interference which consists in selectively deriving from the same radio signal current that produces the interfering effect a balance current of interfering frequency, causing the interfering and balancing currents to act on the receiving system with equal and opposite effects thereby annulling each other, and receiving the unbalanced signal current.

10. The method of receiving radio signal impulses and simultaneously eliminating sustained radio signal interference which consists in deriving from the same radio signal current that produces the interfering effect a balancing electromotive force in phase position to the interfering electromotive force produced by the interfering current, causing the interfering and balancing electromotive forces to act on the receiving system with equal and opposite effects thereby annulling each other, and receiving the unbalanced signal current.

11. The method of receiving signal impulses and simultaneously excluding sustained radio signal interference which consists in deriving signal impulses from a collecting source, balancing received interfering radio signal impulses derived from this source by an equal and opposite impulse derived from the same current that produces the interfering effect thereby balancing the interfering impulses and receiving the unbalanced signal impulses, substantially as set forth.

12. The method of receiving signal impulses and simultaneously excluding sustained interference which consists in causing signal currents and received radio signal currents to act on a system responsive to signal currents, deriving from the same radio signal current that produces the interfering effect an equal and opposite effect to the interfering effect, thereby balancing and neutralizing the interfering effect, and observing the unbalanced signal effect, substantially as set forth.

13. The method of receiving signal impulses and simultaneously excluding interference which consists in causing the received radiations to produce a signal current superimposed on an interfering current, deriving from the interfering current a second current approximately in quadrature with the first, deriving from the second current a third current approximately in quadrature with the second current causing the third current to balance the effect of the first interfering current in magnitude and phase, and receiving the unbalanced signal current, substantially as set forth.

14. The method of receiving signal impulses and simultaneously excluding interference which consists in causing the received radiations to produce a signal current superimposed on an interfering current, deriving from the interfering current a second current approximately in quadrature with the first, deriving from the second current a third current approximately in quadrature with the second current, causing the third current to balance the first interfering current in magnitude, phase and decrement and receiving the unbalanced signal effect, substantially as set forth.

15. The method of receiving signal impulses and simultaneuosly excluding interference which consists in causing a received interfering current to produce two separate electromotive effects, causing the second effect to produce a third electromotive effect approximately in quadrature with the second, causing the third effect to produce a fourth electromotive effect approximately in quadrature with the third, equalizing the first and fourth effects in magnitude and in phase and causing them to balance and neutralize each other, and observing the unbalanced signal effect, substantially as set forth.

16. An apparatus for the reception of radio signals and the simultaneous exclusion of interfering radio signals in which are combined a collecting element, a receiving system operated thereby, a balancing system also operated thereby, means for producing two successive phase differences approximating quadrature in the balancing system and means for securing equality of magnitude and opposition of phase between the interfering effect of the collector element on the receiving system and the effect of the balancing system on the receiving system, whereby the interference is neutralized and the signal energy is received, substantially as set forth.

17. An apparatus for the reception of radio signals and the simultaneous exclusion of sustained interfering radio signals in which are combined a collecting element, a receiving system operated thereby and a balancing system energized by the same received signal current that exerts an interfering effect on the receiving system and including phasing and intensity adjusting means whereby it is caused to impress an effect on the receiving system equal in intensity and opposite in phase to the effect of the interfering current.

18. An apparatus for the reception of radio signals and the simultaneous exclusion of sustained interfering radio signals in which are combined a collecting element, a receiving system operated thereby, a balancing system energized by the same received signal current that exerts an interfering effect on the receiving system and selectively responsive to the interfering frequency, means for varying the constants of the circuit to adjust the phase of the current therein, and means whereby this current is caused to impress an effect on the receiving system equal in intensity and opposite in phase to the effect of the interfering current.

19. An apparatus for the reception of radio signals and the simultaneous exclusion of interfering radio signals in which are combined a collecting element, a receiving system operated thereby, a balancing system energized by the same received signal current that exerts an interfering effect on the receiving system and including a resonant circuit tuned approximately to the interfering frequency and means for slightly varying the reactances of this circuit to adjust the phase of the current therein, and means whereby this current impresses on the receiving system an effect equal and opposite to the effect of the interfering current.

This specification signed this 5th day of July, 1921.

FREDERICK K. VREELAND.